(12) United States Patent
Fang (10) Patent No.: US 7,170,987 B2
(45) Date of Patent: *Jan. 30, 2007

(54) CUSTOMER PREMISES EQUIPMENT THAT CAN SUPPORT MULTIPLE CALL CONTROL LANGUAGES OR MULTIPLE CALL AGENTS

(75) Inventor: Zheng Fang, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/218,217

(22) Filed: Sep. 1, 2005

(65) Prior Publication Data

US 2006/0002539 A1 Jan. 5, 2006

Related U.S. Application Data

(63) Continuation of application No. 09/834,861, filed on Apr. 13, 2001, now Pat. No. 6,985,573.

(51) Int. Cl.
*H04M 7/00* (2006.01)

(52) U.S. Cl. .......................... 379/221.02; 379/201.12; 370/352

(58) Field of Classification Search ........... 379/221.02, 379/265.09, 220.01, 201.12, 115.01; 370/352
See application file for complete search history.

(56) References Cited

U.S. PATENT DOCUMENTS

| | | | | | |
|---|---|---|---|---|---|
| 5,473,679 | A | * | 12/1995 | La Porta et al. | 379/201.05 |
| 5,915,214 | A | * | 6/1999 | Reece et al. | 455/406 |
| 6,622,016 | B1 | * | 9/2003 | Sladek et al. | 455/414.1 |
| 2001/0024436 | A1 | * | 9/2001 | Barraclough et al. | 370/352 |
| 2002/0037001 | A1 | * | 3/2002 | Jin | 370/352 |
| 2002/0058507 | A1 | * | 5/2002 | Valentine et al. | 455/433 |
| 2002/0141386 | A1 | * | 10/2002 | Minert et al. | 370/352 |

\* cited by examiner

*Primary Examiner*—Fan Tsang
*Assistant Examiner*—Olisa Anwah
(74) *Attorney, Agent, or Firm*—Larry T. Cullen (57) ABSTRACT

Consumer premises equipment (CPE) configured to be connected with one of a selectable plurality of call agents using one of a selectable plurality of call control languages in response to user input to the telephone. In one aspect, telephone users can therefore select, e.g., a service provider. In another aspect, the CPE provides VoIP service to a telephone.

15 Claims, 5 Drawing Sheets

CUSTOMER PREMISES EQUIPMENT THAT CAN SUPPORT MULTIPLE CALL CONTROL LANGUAGES OR MULTIPLE CALL AGENTS

CROSS-REFERENCE TO RELATED APPLICATIONS

This application is a continuation of U.S. application Ser. No. 09/834,861, filed on Apr. 13, 2001, now U.S. Pat. No. 6,985,573

FIELD OF THE INVENTION

This invention relates to voice over Internet (VoIP) equipment, and more particularly to customer premises equipment (CPE) associated with the VoIP equipment.

BACKGROUND OF THE INVENTION

Consumer premises equipment (CPE), used in Voice over Internet (VoIP) systems, often includes a variety of devices such as communications gateways (CG) or cable modems. The CPE imparts the connectivity of the VoIP system to subscriber telephone equipment, computers, cable television, or other such devices. Each CPE is typically configured with one or more telephony endpoint to which a single subscriber telephone connects. A call agent is connected to the Internet (IP) network, and the call agent acts to set up and break down the telephone communications over the VoIP system. A single CPE communicates with a single call agent using a single call control language to provide VoIP services to the single CPE. Each call agent is typically operated, controlled, and granted access by a distinct service provider such a long-distance carrier or a local carrier. Different service providers may provide their VoIP services using a slightly different call control language. Requiring a single control language be used by a CPE limits the potential variety of VoIP services that can be selected by the VoIP customers. If the user wants to be able to select one of multiple call agents, call control languages, or service providers, then it may be necessary for the user to undergo the expense of connecting multiple telephone lines to their business or home.

It would be desirable to configure the CPE equipment to have the ability to interact with multiple service providers, with each one of the multiple service providers possibly using a distinct call agent and a distinct call control language. For CPE users, it may also be desired to use their CPE so each subscriber telephone can provide a selection of multiple services, call agents, or call control languages.

SUMMARY OF THE INVENTION

The present invention is directed to an apparatus and associated method a consumer premises equipment (CPE) configured to be connected with one of a selectable plurality of call agents using one of a selectable plurality of call control languages in response to user input to the telephone. In one aspect, telephone users can therefore select, e.g., a service provider. In another aspect, the CPE provides VoIP service to a telephone.

BRIEF DESCRIPTION OF THE DRAWINGS

The accompanying drawings, which are incorporated herein and constitute part of this specification illustrate a preferred embodiment of the invention.

DETAILED DESCRIPTION OF THE EMBODIMENT

Figure 1:
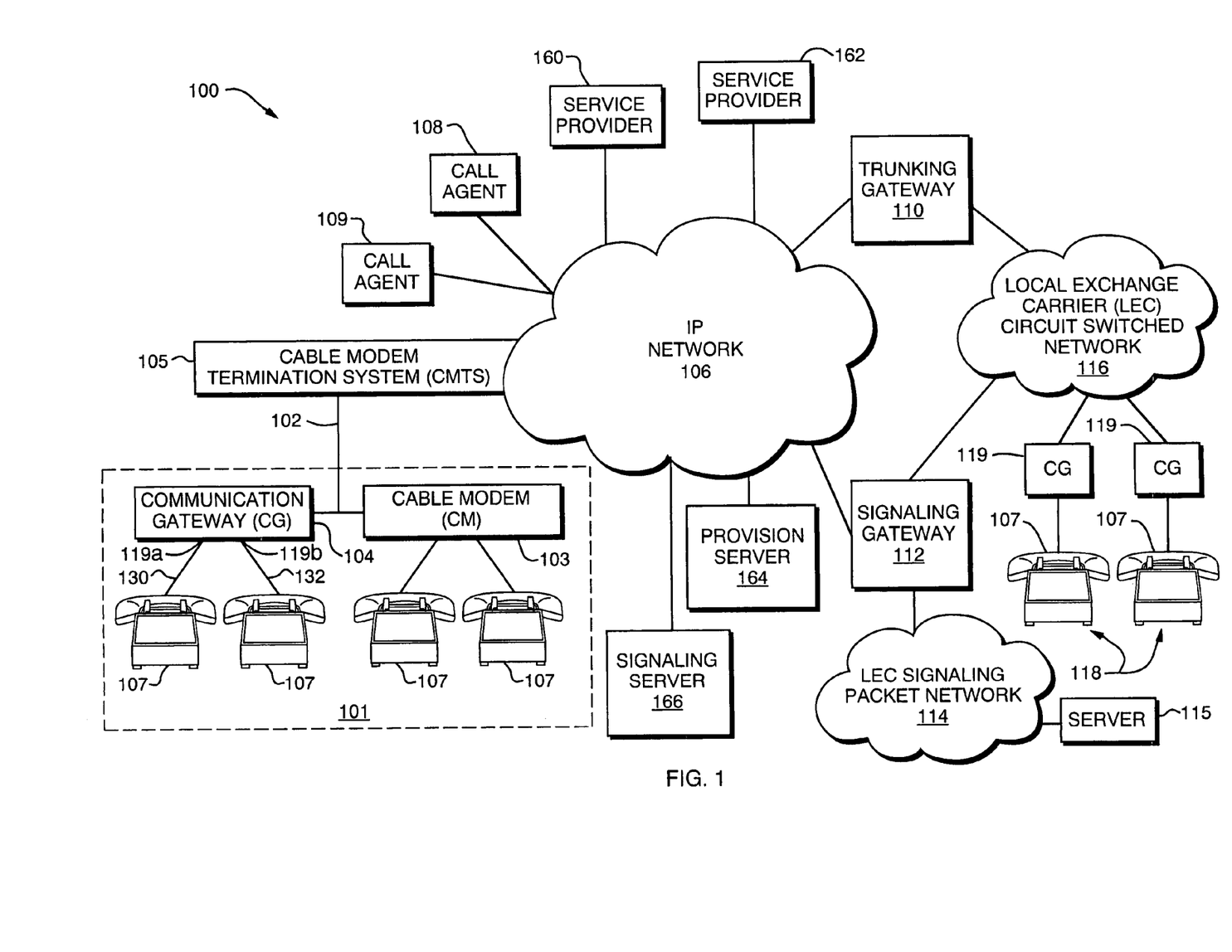
FIG. 1 is a block diagram of one embodiment of a Voice over Internet (VoIP) system.

This disclosure describes an embodiment, shown in FIG. 1, of a Voice over Internet (VoIP) system 100 that is used to provide telephone service between subscriber telephones 107. The user can select the type of service (service provider, call agent, or call control language) desired. The general structure and operation of the VoIP system 100 is described. A method by which a user selects one of a plurality of telephone services is also described.

The VoIP system 100 provides for voice communication between a plurality of customer premises equipment (CPE) 101 using a combination of an Internet (IP) network 106 and a hyper fiber coax network (HFC) 102. Alternatively, the VoIP system 100 provides for voice communication between a CPE 101 and a CPE 118 over the IP network 106, the HFC 102, and a LEC circuit switched network 116. The CPE 101 is configured to include, e.g., a cable modem 103 and a subscriber telephone 107, or any other communication device such as a communications gateway (CG) 104 or broadband telephony interface (BTI) that allows for subscriber telephone 107 to communicate over the IP network 106. A HFC 102 is configured to provide optic-based cable communications between the CPE 101 and a cable modem termination system (CMTS) 105.

The embodiment of VoIP system 100 shown in FIG. 1 includes the CPE 101 (that includes the cable modem 103, the HFC 102, the CMTS 105, the IP network 106, one or more subscriber telephones 107, a plurality of call agents 108 and 109, a trunking gateway 110, a signaling gateway 112, a local exchange carrier (LEC) signaling packet network 114, a LEC circuit switched network 116, a remote CPE 118, and a plurality of subscriber telephones 107 coupled to the CPE 118. The VoIP system 100 provides communication using the IP network 106 between the subscriber telephones 107 connected respectively to the CPE 101 and/or the remote CPE 118.

Also included in the VoIP system 100 is a first service provider 160, a second service provider 162, a provision server 164, and a signaling server 166. The service providers 160, 162 may be configured as servers, standalone computers, or any computer that provides access to the VoIP service to the subscriber telephones 107. The signaling server 166 may be configured as a server, a standalone computer, or any computer that provides signaling capabilities to the VoIP system. The provision server 164 may be configured as a server, a standalone computer, or any computer that provides provision options to users of subscriber telephones 107.

Though the service providers 16, 162, the signaling server 166, and the provision server 164 are shown in communication with the IP network 106 in the embodiment of FIG. 1, it is envisioned that one or more of these servers may be physically resident on the LEC circuit switched network 116, on the LEC signaling packet network 114, or on the HFC 102 where appropriate. The VoIP system 100 provides communication using the IP network 106 between telephone handsets 107 connected to the CPE 101 and/or the remote CPE 118.

Figure 2:
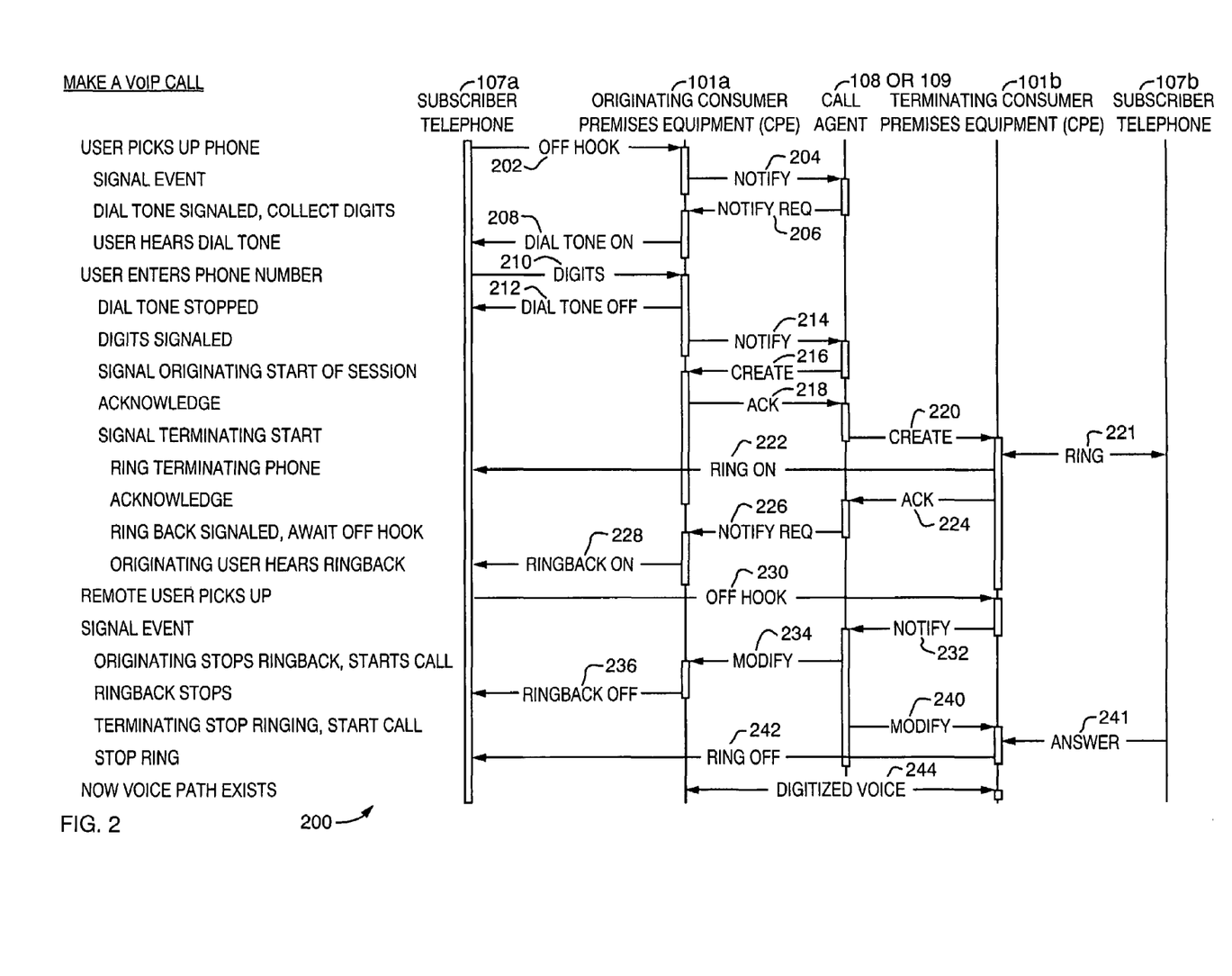
FIG. 2 shows one embodiment of call control signal diagram displaying call control signals associated with the VoIP system of FIG. 1.

The HFC 102 allows for the cable modem 103 to communicate via the CMTS 105 over the IP network 106. This disclosure describes the interaction between one embodiment of CPE 108, as shown in FIG. 2, and other portions of the VoIP system 100. The HFC 102 allows for data and IP voice to share the bandwidth with television channels. The CPE 101 includes one or a plurality of telephone end points to which the subscriber telephone 107 connects. The CMTS 105 can be configured to provide for data, cable TV and/or telephone applications.

One embodiment of HFC 102 uses the Data Over Cable Systems Interface Specification (DOCSIS) protocol. DOCSIS is a standard for the cable modem interface over the HFC 102 between a cable TV operator and a computer or subscriber telephone. DOCSIS has been accepted as a standard since DOCSIS 1.0 when it was ratified by the International Telecommunication Union (ITU) in March of 1998. Cable modems conforming to DOCSIS are commercially available from a variety of vendors.

Different embodiments of telephone service use the VoIP system 100. One embodiment of VoIP service is referred to as "on-net calls," in which multiple CPEs 101 communicate using the IP network 106 and/or the HEC 102 only. Another embodiment of VoIP telephone service is referred to as "off-net calls" in which a CPE 101 communicates with the remote CPE 118 over a hybrid network system including the LEC circuit switched network 116 portion and the IP network 106. Off-net calls involve not only the IP network 106 and the HFC 102 as do on-net calls, but also involve a LEC circuit switched network 116, a trunking gateway 110, and the signaling gateway 112 as shown in FIG. 1.

The selected call agent 108 or 109 initiates and terminates the calls in the IP network 106. Typically multiple call agents 108, 109 are connected to the IP network 106, and a different service provider may operate each call agent 108, 109. Each call agent 108 and 109 may use one of a variety of call control languages such as Network Control System (NCS), Simple Gateway Control Protocol (SGCP), Multimedia Gateway Control Protocol (MGCP), GR303, and others. The call agents 108 or 109 acts as a master of set-up and teardown for VoIP voice communications.

The call agents 108, 109 include the necessary hardware and software to provide the signals that initiate, monitor, regulate, and terminate VoIP communication. Each call agent 108, 109 maintains the call state, performs phone number to IP address translations, and implements class features. One embodiment of call agent 108, 109 is fashioned as a server that runs an operating system such as a UNIX or WINDOWS NT® (A registered trademark of Microsoft Corporation of Redmond, Wash.). The call agents 108, 109 may be configured as a server, a stand-alone computer, a PC, or any type of computer having adequate processing, memory and I/O capabilities to provide VoIP service. The details of the call agents 108, 109 are depicted in FIG. 1.

The call agents 108, 109 includes a programmable central processing unit (CPU) 191 that is operable with a memory 192 (e.g., RAM, ROM, hard disk and/or removable storage) and well-known support circuits 193 such as power supplies, clocks, cache, and the like. Additionally, each call agent 108, 109 includes I/O circuits 197 that produce control signals, such as a control output signal, and receive signals such as an input signal. By executing software stored in the memory 192, the call agents 108, 109 produces the output that leads to call set-up, call termination, voice transmission, and other features that provide for telephone communication over the VoIP system.

Each call agent interacts with a media terminal adapters (MTA) 136 or 138 that are included in their respective CPE as shown in the embodiment of FIG. 2. The plurality of MTAs 136, 138 are integrated in the cable modem 103. Each MTA 136, 138 acts under the control of, and is configured to interact with, its respective call agent 108, 109. Each MTA 136, 138 is controlled by the respective call agents 108, 109 to monitor for events occurring at the subscriber telephone 107, and report events (e.g., an off-hook condition). Each MTA 136, 138 sets up and tears down RTP streams as commanded. Each call agent 108, 109 operates independently under the control of an associated MSO to command its respective MTA 136, 138 to monitor VoIP events, establish signal tones, and set up or tear down real time protocol (RTP) voice streams.

If, however, an off-net call is being made, then the VoIP system 100 has to establish communications to a Local Exchange Carrier (LEC) network portion 150 as well as the combined IP network 106 and HFC 102. Central offices included in the LEC circuit switched network 116 are used to set-up and break down the calls in the LEC circuit switched network 116 portion of the VoIP system. The communications between the IP network 106 and the LEC circuit switched network 116 can be categorized to include signal and voice communication portions. The signal communications establish and break down the channels by which the voice communications are transmitted. In one embodiment of off-net calls, the signal and the voice packets follow different routes (e.g. over the retrunking gateway 110 and the signaling gateway 112) between the IP network and the LEC circuit switched network 116.

The trunking gateway 110 shown in FIG. 1, provides for voice communication interconnection those portions of the VoIP system 100 that use the IP network (and communicate using the RTP protocol) and those portions of the VoIP system that use the LEC circuit switched network 116 (and use the phase code modulation (PCM) protocol). The trunking gateway 110 converts voice packets between the RTP packets used in the IP network 106 and the phase code modulation (PCM) packets used in the LEC circuit switched network 116.

The trunking gateway 110 sets up, maintains, and tears down voice steams provided between the IP network and the LEC circuit switched network 116. The trunking gateway 110 thus has to provide for a mapping between the portions of the network that use the RTP protocol from those portions of the network that use the PCM protocol. The trunking gateway 110 sets up and tears down RTP and PCM steams, as commanded by the call agent 108, 109. The trunking gateway 110 therefore acts as a slave to either the call agent 108, 109 in the IP network 106 or the central office (not shown) in the LEC circuit switched network. The trunking gateway 110 also monitors the RTP packets in RTP streams transmitted between the IP network 106 and the LEC circuit switched network 116.

The LEC signaling packet network 114 controls the signaling provided over the signaling gateway 112 between the IP network 106 and the LEC circuit switched network 116. The signals will be transmitted between the IP network and the LEC circuit switched network 116 will result in the set up and break down of off-net calls via the signaling gateway.

Figure 3:
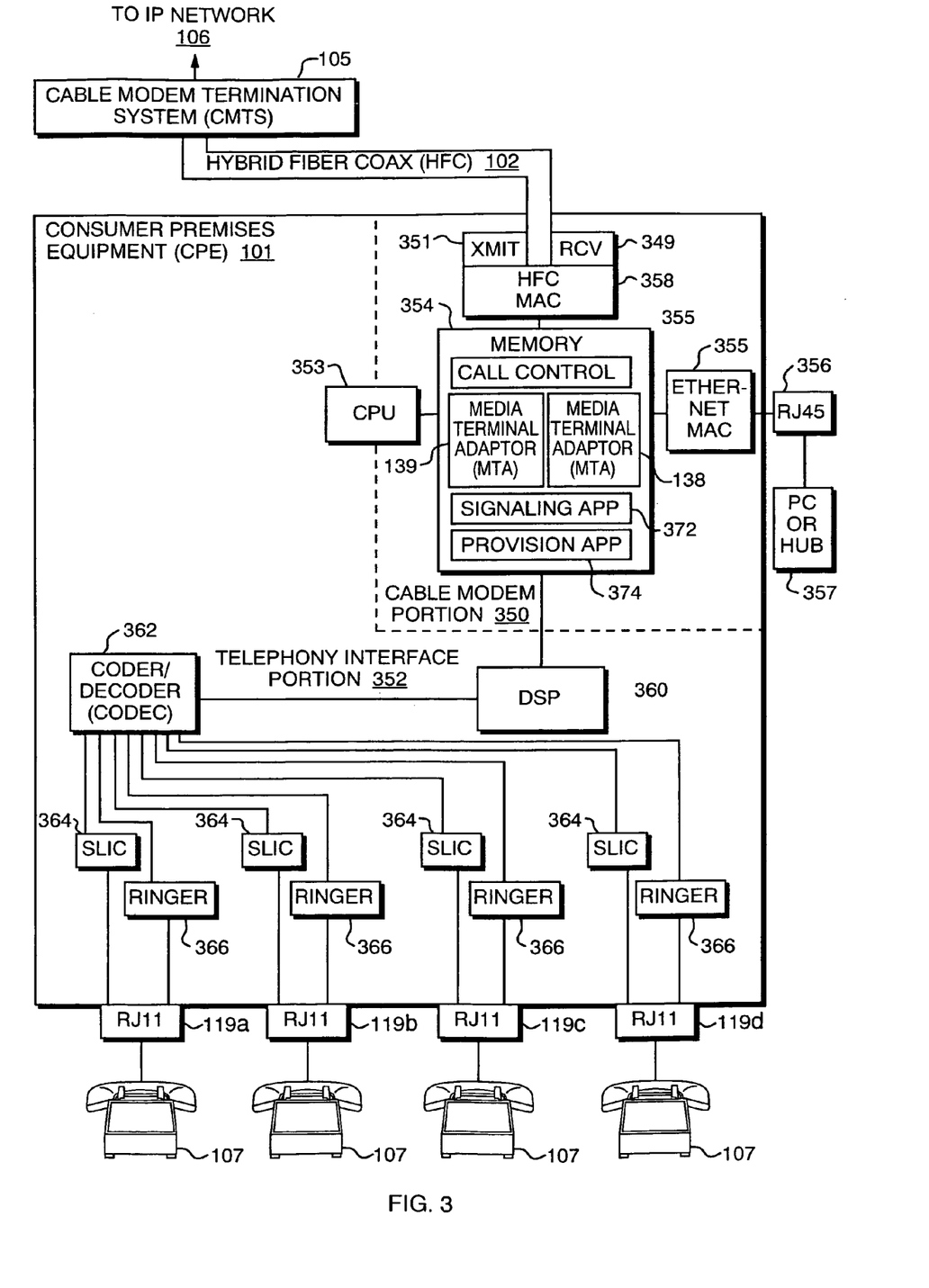
FIG. 3 is a block diagram of one embodiment of consumer premises equipment (CPE) shown in the VoIP system shown in FIG. 1.

FIG. 3 shows one embodiment of CPE 101 as shown in FIG. 1. The CPE includes the cable modem portion 350, a telephony interface portion 352, a central processing unit (CPU) 353, a memory 354, a receiver 349, and a transmitter 351. The cable modem portion 350 is configured to provide IP network data communications to, e.g., via an Ethernet media access control (MAC) 355 and a high speed data port RJ45 (Ethernet) computer connector 356 to a computer or hub 357 or via one or more RJ11 connectors to one or more subscriber telephone 107.

The cable modem portion 350 also includes an HFC media access control (HFC MAC) 358 that provides a layer 2 interface between the HFC 102 and the combined memory 354 and CPU 353. The CPU 353 may be shared by both the cable modem portion 350 and the telephony interface portion 352. An Ethernet MAC 355 provides an interface between a PC or hub 357 and the CPU 253/memory 354. The telephony interface portion 352 is configured to provide IP network voice communications to, e.g., one or more subscriber telephones 107. The CPU 353 controls and manages the processes occurring within the CPE 101 by data transfer and data storage between the components of the CPE.

In one embodiment, the cable modem portion 350 includes a chip that integrates many of the above components. For example, Broadcomm Corporation of Irvine, Calif. produces one commercially available cable modem chip as the BCM3350 that combines the integrated 64/256-Quadrature Amplitude Modulation (QAM) receiver 349, a Quadrature Phase Shift Keying (QPSK)/16-Quadrature Amplitude Modulation (QAM) transmitter 351, a complete DOCSIS HFC media access control (MAC) 358, a MIPS32 CPU 353, and a memory interface.

The receiver 349 directly samples a tuner output using an integrated pin grid array (PGA) package and analog to digital (A/D) converter, digitally resamples and demodulates the signal using recovered clock and carrier timing, filters, and equalizes the data. The soft decisions resulting from the sampling are passed to a compatible decoder. The final received data stream from the receiver 349 is delivered in MPEG-w transfer format. All gain, clock, and carrier acquisition and tracking loops are integrated in the receiver. The transmitter 351 takes burst or continuous data, provides encoding and pre-equalization for the DOCSIS application, filters, and modulates the data stream, and provides a direct analog output to the HFC.

The telephony interface portion 352 includes a digital signal processor (DSP) 360, a coder/decoder (CODEC) 362, a plurality of subscriber line interface channels (SLIC) 364, a plurality of ringers 366, and a plurality RJ11 telephone jacks 119. One subscriber telephone 107 may fit within each one of the plurality of RJ11 telephone jacks 119. The ringer 366 produces a ring in a prescribed subscriber telephone 107 when called from another subscriber telephone 107.

The DSP 360 performs such voice protocol processing as compression, decompression, dial tone generation, dual tone multi-frequency (DTMF) tone detection, echo cancellation, etc. The DSP generates phase code modulation (PCM) signals what are sent to the CODEC 362. The DSP 360 also processes received PCM signals originating from the subscriber telephone 107 via the CODEC 362, and transfers the processed signal to the cable modem portion 350. The DSP is commercially available from such companies as Motorola, Incorporated of Schaumburg, Ill. and Texas Instruments of Dallas, Tex.

The digital interface between the DSP 360 and the CODEC 362 uses pulse code modulation (PCM). The CODEC 362 receives digital information from the DSP 360 in the form of a bit-stream where, in one embodiment, the amplitude of the incoming signal is related to the digital value (e.g., a digital 0 or 1) being sent. The CODEC 362 processes the PCM signals from the DSP 360, and generates an analog signal that is transmitted to the appropriate SLICs.

In signals originating at the subscriber telephone, the CODEC 362 samples the signal from the SLIC 364 and translates the discrete amplitude into a digital number that is sent to the DSP, thereby translating the audio signals received from the SLIC into phase code modulated (PCM) signals that can be transferred to the DSP. The CODEC 362 transmits data to, and receives data from, the DSP utilizing the CODEC pins. The frame sync signals determine the frame's start position and the channel data that will be transmitted.

One SLIC 364 acts to connect the CPE 101 with one subscriber telephone 107. The appropriate SLIC 364 translates the analog signals received from the CODEC 362 into voice signals (voltage levels) that can be converted by the subscriber telephone into voices or audible noises. The SLIC 364 also transfers audio signals from the microphone of the subscriber telephone 107 to analog signals that are received, and processed by, the CODEC. The SLIC 364 provides an interface between the RJ11 telephone jack 368 and the CODEC 362. The SLIC 364 interfaces with the CPU by sending an interrupt to the CPU, when necessary. The SLIC uses the interrupt to inform the CPU of the occurrence of events at the subscriber telephone. The SLIC 364 also contains circuits for loop-back testing that is used to test the operation of the subscriber telephone 107. The functions of the SLIC 364 includes limit is configured to echoes produced as signals encounter conductor discontinuities by flowing through portions of the CPE 101.

The memory 354 may include RAM or ROM portions. More particularly, the memory 354 includes a dynamic RAM (DRAM) that is configured to perform a variety of operations. Certain ones of the operations stored in the memory 354 that may be accessed by the CPU include a call control protocol engine 355, a signaling application 372, a provision application 374, and the media terminal adapters (MTA) 136, 138 with which the respective call agents 109, 108 interact. The call control protocol engine 355, the signaling application 372, the provision application 374, and the MTAs 136, 138 provide their operation with the interaction between the CPE 353 and the memory 354. The signaling application 372 interacts with the signaling server 166 shown in FIG. 1 to provide the signaling functionality to the CPE 101. The provision application 374 interacts with the provision server 164 to provide the provision functionality to the CPE 101. The use of multiple MTAs 136, 138 in the memory 354 provide for interaction of the CPE to different call agents 109, 108 using multiple call control languages.

Signaling packets are dynamically constructed on the DRAM, then the packets are sent via the HFC MAC 358 to the HFC 102 and the call agent 107 or 108. The signal application 372 interacts with the signaling server 166 shown in FIG. 1 to provide the signals necessary to set up, break down, or maintain the voice communications using the VoIP system. The provision application interacts with the provision server shown in FIG. 1 to provide user interaction with the VoIP system so the user can select a particular MSO, call agent, call options, call control language, etc. The HFC MAC 358 supports baseline privacy encryption, decryption, and transmission convergence sub-layer support. The HFC MAC 358 includes all features necessary for DOCSIS 1.0 and 1.1 compliance.

FIG. 2 shows one embodiment of call control signal diagram 200 that is provided over the VoIP system 100 that relates to the signaling to establish a call between a subscriber telephone 107a located at a first CPE 101a and a subscriber telephone 107b located at a second CPE 101b. The embodiment of call control signal diagram 200 shown in FIG. 2 may be used by one call agent 108 along with the first CPE 101a (or portion of CPE 101) that interacts with that call agent. Both the first CPE 101a and the second CPE 101b are configured, in one embodiment, similar to the CPE 101 shown in FIGS. 1 and 3. A slightly modified call control signal diagram (perhaps defined by one of the above standardized call control languages) may be used by a modified embodiment of call agent 109 (the call control signal diagram and the associated software being modified) along with the second CPE 101b (or portion of a CPE) that communicates with the call agent 109. The call control signal diagram 200 starts with an off-hook signal 202 is transmitted from the subscriber telephone 107a to the first CPE 101a. The off-hook signal 202 is transmitted, e.g., when the handset of the subscriber telephone 107a is lifted. Following the first CPE 101a receiving the off-hook signal, the first CPE 101a transmits a notify signal 204 to the first call agent 109. In response to the notify signal 104, the first CPE 101a transmits a notify request signal 206.

Following the notify request signal 206 received by the first CPE 101a in the call control signal diagram 200, the first CPE 101a transmits a dial tone on signal 208 to the subscriber telephone 107a. As the subscriber telephone 107a receives the dial tone on signal 208, a dial tone is established in the ear-piece of the subscriber telephone 107a. At this time, the user can dial digits in the subscriber telephone corresponding to the phone number. As the digits are entered in the subscriber telephone 107a, a digit signal 210 including the dialed phone number is transmitted from the subscriber telephone 107a to the first CPE 101a. As the digit signal is received by the first CPE 101a, a dial tone off signal 212 is transmitted from the first CPE 101a to the subscriber telephone 107a. The dial tone off signal 212 deactuates the dial tone in the subscriber telephone 107a.

Following the digit signal 210 being received by the first CPE 101a, a notify session signal 214 is transmitted from the first CPE 101a to the first call agent 109. When the first call agent 109 receives the notify session signal 214, a create session signal 216 is transmitted from the first call agent to the first CPE 101a. The notify session signal 214 and the associated create session signal 216 are provided to create a session in which the RTP transmits voice over the VoIP system 100. After the create session signal 216 is received by the first CPE 101a, an acknowledgment (ACK) signal 218 is transmitted from the first CPE 101a the first call agent 109. Following the reception of the ACK signal 218 at the call agent 109, the call agent 109 transmits a create signal 220 to the second CPE 101b. Following the reception of the created signal 220 at the second CPE 101b, a ring signal 221 is transmitted from the CPE 101b to the subscriber telephone 107b that creates a ring in the subscriber telephone 107b. The ring is created using the ringer 336 contained in the subscriber telephone 107b.

Following the reception of the create signal 220 at the second CPE 101b, a ring on signal 222 is transmitted from the terminating CG 118 to the subscriber telephone 107a. The ring on signal 222 indicates to the subscriber telephone 107a that the second CPE 101b is ringing its associated subscriber telephone 107b. The transmission of the ring on signal 222 by the CPE 101b limits such further activity of the CPE 101b as dialing another number.

Following the transmission of the ring on signal 222, an ACK signal 224 is transmitted from the second CPE 101b to the call agent 109. Following the reception of the ACK signal 224, the call agent 109 transmits a notify request signal 226 to the first CPE 101a. As the first CPE receives the notify request signal 226, a ringback on signal 228 is transmitted from the first CPE 101a to the subscriber telephone 107. The receipt of the ringback on signal 228 interacts with the ringer 366 to produce the ringing in the ear-piece of the subscriber telephone 107a indicating that the called telephone is ringing as a result of the ring signal 221.

Following the receipt of the ringback on signal 228, an off hook signal 230 is transmitted from the subscriber telephone 107a to its associated second CPE 101b. As the second CPE 101b receives the off hook signal 230, a notify signal 232 is transmitted from the second CPE 101b to the call agent 109. The off hook signal 230 allows the second CPE 101b to transmit the notify signal 232. Following the reception of the notify signal 232, the first call agent 109 transmits a modify signal 234 from the first call agent 109 to the first CPE 101a. Following the reception of the modify signal 234 of the first CPE 101a, a ringback off signal 236 is transmitted from the first CPE 101a to the subscriber telephone 107a and a distinct modify signal 240 is transmitted from the call agent 109 to the second CPE 101b. An answer signal 241 is transmitted from the subscriber telephone 107b to the CPE 101b indicating the subscriber telephone has responded (by, e.g., a user picking up the handset or an answering machine responding). Upon reception of the ringback off signal 236 at the subscriber telephone 107a, the ringing stops in the ear-piece of the subscriber telephone 107 connected to the first CPE 101a.

Following the reception of the distinct modify signal 240 received at the second CPE 101b from the call agent 109, a ring off signal 242 is transmitted from the second CPE 101b to the subscriber telephone 107b. The ring off signal 242 indicates that the ringing at the second CPE 101b has been stopped. Following the transmission of the ring off signal 242, a VoIP voice transmission pathway 244 is established between the first CPE 101a and the second CPE 101b. The voice transmission pathway 244 provides for voice transmission between the subscriber telephone 107a located respectively at the first CPE 101a and the subscriber telephone 107b located at the second CPE 101b. The first local transmission pathway 244 is typically established using a different path from that described for the signals 202 to 242.

The embodiment of call control diagram 200 is exemplary and not limiting in scope. The multiple call agents 108, 109 may, or may not, have a variety of call control languages. Each call control language is represented by a slightly different embodiment of call control diagrams to provide interaction to only those CPEs 101 (and the associated telephony equipment such as the CG 104, CM 103, and subscriber telephones 107) that are configured to interact with those call control languages.

Figure 4:
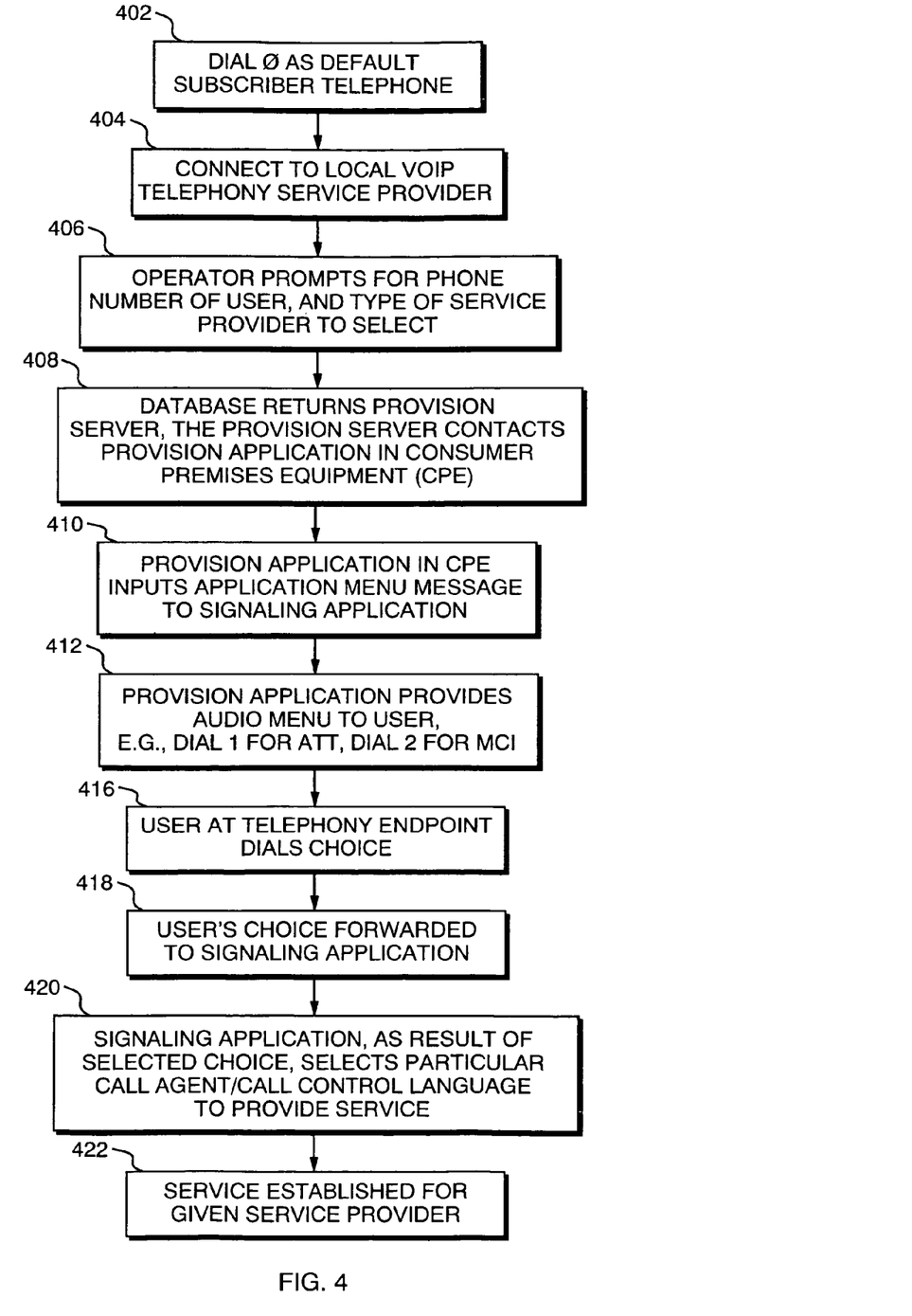
FIG. 4 shows a flow chart of embodiment of method performed by the consumer premises equipment (CPE) of FIG. 3 in selecting one call agent or call control language in which to make a call over the VoIP system shown in FIG. 1.

FIG. 4 shows one embodiment of method performed by the VoIP system 100 shown in FIG. 1 whose operation largely results from the call control protocol application 355 in the CPE 101. The method 400 allows for a user to select between multiple call control languages or multiple call agents while using a single CPE 101. In step 402, the user picks up a handset of a subscriber telephone 107 and dials 0, as a default to select a menu. This default selection acts to connect the local VoIP telephony service provider as shown in step 404. The provision application 374 of the memory 354 in the CPE 101 is configured to allow the user to select one of a variety of service providers, call connection languages, call agents, etc.

In step 406, the provision application 374 is actuated to interact with the provision server by an operator prompting a user for a number to choose, each number corresponds to a certain type of service provider, as can be handled by multiple call agents using multiple call control languages. For example, the operator application associated with the provision application may prompt the user to input the users selection the keypad of the subscriber telephone 107. For example, the operator may prompt the user to press "1" to select one service provider, press 2 to select for another service provider, or press different numbers for different call agent/call control language combinations associated with perhaps another service providers. The method 400 continues to step 408 in which, based on the input by the user, the database application associated with the provision application is input the CPE provision application 374 shown in FIG. 3 to provide the prompts to the user of the subscriber telephone 107. The database application is located in the provision server.

In step 410 of method 400, the CPE provision application inputs the application menu to the signaling application 372. The method 400 continues to step 412 in which the CPE provision application provides the application menu to the user in audio or graphics form (if graphics capabilities exist on the subscriber telephone). (An example of such a menu might be "good morning, dial 01 to have service provided by AT&T, dial 02 to connect to have service by MCI, etc."). The method 400 continues to step 416 in which the user dials a number corresponding to the menu to select a choice on the keypad of the subscriber telephone. Based upon the user selection, the CPE will communicate to one of the call agents 108, 109 using the call control language of that agent. The method 400 continues to step 418 in which the choice dialed by the user in step 416 is forwarded to the signaling application 372.

In step 420, the signaling application, in response to the selected choice as prompted by the provision application, selects a particular call agent 108 to handle the call and provide the service. The method 400 continues to step 422 in which the service is established to the CPE 101 as provided by the call agent 108. The call agent 108 will dictate the type of service that is to be provided, including the call control language, the allowed service option, etc. based on the users selection dialed in step 416. The provision application 374 can also interface in a similar matter with the signaling application 372 to the method 400 to determine selected call options. For example, a certain call can be made using call waiting, caller identification "ID", or other services that may be provided. In the embodiment shown in FIG. 4, a single user interfacing with a single subscriber telephone 107 connected to a single CPE 101 can select one out of multiple call control languages, MSOs, call agents, etc.

It is envisioned that a similar method as shown in FIG. 4, can be provided to each of a plurality of subscriber telephones 107 that are configured to each fit within a plurality of RJII telephone jacks 107 as shown in the embodiment in FIG. 3. For example, there are 4 subscriber telephones 107 shown in the embodiment of FIG. 3 as being connected to the CPE 101. A first user that connects to one of the subscriber telephones 107 can connect to a selected one of a plurality of MSO's, call agents, call control languages, or calling options, using the method 400. A second user can pick up another one of the subscriber telephones, by interfacing with the signaling application 372 and the provision application 374, and can select either of the same call options, call control languages, call agents, as provided to the first subscriber telephone 107. Alternatively, the second user may be required to select a different group of users, as indicated by the interaction between the CPE 101 and the remote call agents 108.

Figure 5:
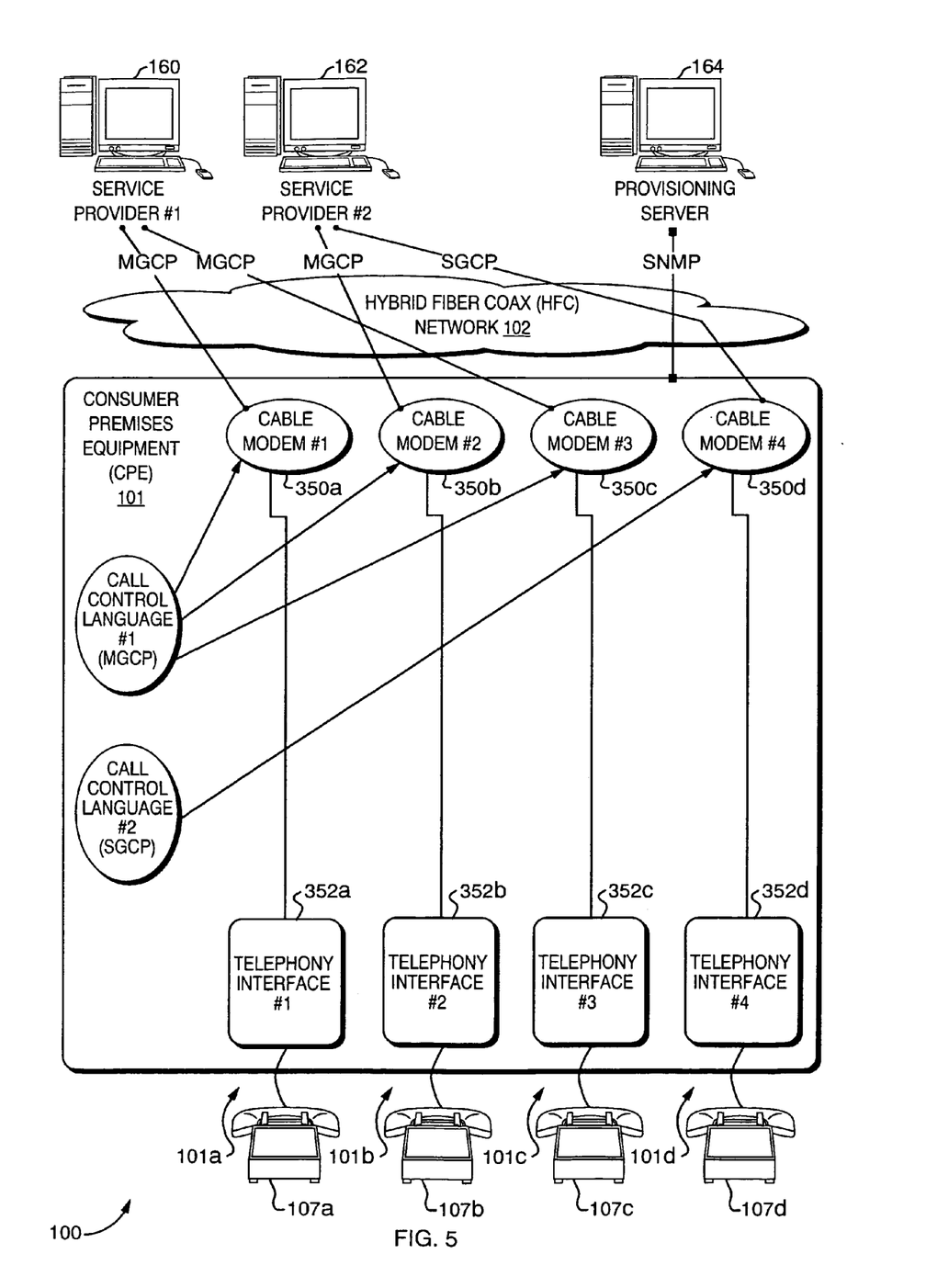
FIG. 5 shows one embodiment of VoIP connection between multiple subscriber telephones (connected to a single customer premises equipment (CPE)) and multiple call agents.

In the embodiment of telephone communications across the VoIP system 100 shown in FIG. 5, the CPE 101 is arranged to each subscriber telephone 107a to 107d can be in communication with a different service provider 160 or 162, using a different call agent and a different call control language. In FIG. 5, the CPE 101 is functionally subdivided into a plurality of CPE 101a, 101b, 101c, and 101d that are in respective communication with subscriber telephones 107a, 107b, 107c, and 107d. Each one of the plurality of CPE 101a, 101b, 101c, and 101d functionally include respective telephony interface portions 352a, 352b, 352c, and 352d and respective cable modem portions 350a, 350b, 350c, and 350d. Each of the telephony interface portions 352a, 352b, 352c, and 352d contains similar components (some of them may be shared) to the embodiment of telephony interface portion 352 shown in FIG. 2. Each of the cable modem portions 350a, 350b, 350c, and 350d contains similar components (some of them may be shared) as the embodiment of cable modem portions 350 shown in FIG. 2.

In the embodiment shown in FIG. 5, the provision server 164 is configured so cable modem 350a communicates with service provider 160 using the Multimedia Gateway Control Protocol (MGCP) call control language to provide telephone service for subscriber telephone 107a. The cable modem 350b communicates with service provider 162 using the MGCP call control language to provide telephone service for subscriber telephone 107b. The cable modem 350c communicates with service provider 160 using the MGCP call control language to provide telephone service for subscriber telephone 107c. The cable modem 350d communicates with service provider 162 using the Simple Gateway Control Protocol (SGCP) call control language to provide telephone service for subscriber telephone 107d.

The embodiment of VoIP system 100 shown in FIG. 5 functionally illustrates how a plurality of subscribe telephones 107 that are connected to a single CPE 101 can each communicate with different call agents (and/or different service providers) using different call control languages.

While the principles of the invention have been described above in connection with the specific apparatus and associated method, it is to be clearly understood that this description is made only by way of example and not as a limitation on the scope of the invention. Though the above concepts have been described relative to a VoIP system, it is envisioned that the concepts also apply to the plain old telephone systems (POTS), digital telephone systems, and cellular telephones.

What is claimed is:

1. An apparatus comprising:
    a consumer premises equipment (CPE) configured to be connected with a plurality of call agents in response to user input, each call agent using one of a plurality of call control languages, and the user input including a selection of a call agent and call control language associated with the call agent;

wherein the CPE is configured to communicate with at least a first telephonic device and a second telephonic device;

wherein the first telephonic device communicates with a first VoIP service provider using a first call agent and a first call control language, and the second telephonic device communicates with a second VoIP service provider using a second call agent and a second call control language that is different from the first call control language, the first and second telephonic devices communicate concurrently.

2. The apparatus of claim 1, further comprising a provision server that provides a menu for the user to select one from the plurality of call agents and select one from the plurality of call control languages.

3. The apparatus of claim 1, further comprising a signaling server that establishes or disconnects voice communication with the one from the plurality of call agents using the one from the plurality of call control languages.

4. The apparatus of claim 1, wherein the CPE further comprising a call control protocol engine that can interact with either a first one of the plurality of call control language or a second one of the plurality of call control language.

5. The apparatus of claim 1, wherein the plurality of call control languages are included from the list of Network Control System (NCS), Simple Gateway Control Protocol (SGCP), MGCP, or GR303.

6. The apparatus of claim 1, further comprising a first VoIP service provider and a second VoIP service provider, wherein the first VoIP service provider enforces the first call control language and the second VoIP service provider enforces the second call control language.

7. The apparatus of claim 1, wherein the consumer premises equipment (CPE) manages a plurality of telephony endpoints, the CPE controllably communicates with a plurality of call agents in response to user input at each one of the plurality of telephony endpoints.

8. The apparatus of claim 1, wherein the CPE comprises a communications gateway.

9. The apparatus of claim 1, wherein the user input is provided through the subscriber telephone.

10. A method comprising:

connecting a consumer premises equipment (CPE) with a plurality of call agents in response to user input, each call agent using one of a plurality of call control languages, and the user input including a selection of a call agent and call control language associated with the call agent;

wherein the CPE is configured to communicate with at least a first telephonic device and a second telephonic device;

wherein the first telephonic device communicates with a first VoIP service provider using a first call agent and a first call control language, and the second telephonic device communicates with a second VoIP service provider using a second call agent and a second call control language that is different from the first call control language, the first and second telephonic devices communicate concurrently.

11. The method of claim 10, further comprising providing a menu for the user to select one from the plurality of call agents and for the user to select one from the plurality of call control languages.

12. The method of claim 10, further establishing voice communication with the one from the plurality of call agents using the one from the plurality of call control languages.

13. The method of claim 10, wherein the call control languages include one from the list of Network Control System (NCS), Simple Gateway Control Protocol (SGCP), MGCP, or GR303.

14. The method of claim 10, further comprising:

enforcing the first call control language using a first VoIP service provider; and enforcing the second call control language using a second VoIP service provider.

15. The method of claim 10, wherein the CPE comprises a communications gateway.

* * * * *